US008100388B2

(12) United States Patent
Lee et al.

(10) Patent No.: US 8,100,388 B2
(45) Date of Patent: Jan. 24, 2012

(54) ELECTROMAGNETIC ACTIVE ENGINE MOUNT APPARATUS

(75) Inventors: Doo Hum Lee, Incheon (KR); Hyung Su Kang, Siheung-si (KR); Jeong Hoon Kim, Seoul (KR); Sung Woo Hong, Incheon (KR); Ho Chul Lee, Incheon (KR)

(73) Assignees: Hyundai Motor Company, Seoul (KR); Daedong Movel System Co., Ltd., Siheung-Si (KR); Automobile Industrial Ace Co., Ltd., Ansan-Si (KR); Daedong System Co., Ltd., Incheon (KR)

( * ) Notice: Subject to any disclaimer, the term of this patent is extended or adjusted under 35 U.S.C. 154(b) by 289 days.

(21) Appl. No.: 12/474,066

(22) Filed: May 28, 2009

(65) Prior Publication Data

US 2009/0295050 A1 Dec. 3, 2009

(30) Foreign Application Priority Data

May 29, 2008 (KR) ........................ 10-2008-0050371

(51) Int. Cl.
*F16M 5/00* (2006.01)
(52) U.S. Cl. ............................... 267/140.14; 267/140.15
(58) Field of Classification Search .................. 267/140.14–140.15; 248/550, 248/562, 566
See application file for complete search history.

(56) References Cited

U.S. PATENT DOCUMENTS

| 6,325,364 | B1* | 12/2001 | Muramatsu ............. 267/140.14 |
| 6,352,249 | B2* | 3/2002 | Muramatsu et al. ..... 267/140.14 |
| 6,406,010 | B1* | 6/2002 | Yano et al. ............... 267/140.14 |
| 6,921,067 | B2* | 7/2005 | Gries et al. ............... 267/140.14 |
| 2004/0188905 | A1* | 9/2004 | Goto et al. ............... 267/140.15 |
| 2005/0001365 | A1* | 1/2005 | Kon et al. ................ 267/140.14 |
| 2006/0001204 | A1* | 1/2006 | Kato et al. ............... 267/140.14 |

FOREIGN PATENT DOCUMENTS

| JP | 07-071515 A | 3/1995 |
| JP | 2005-291276 A | 10/2005 |
| JP | 2006-002792 A | 1/2006 |
| JP | 2007-255584 A | 10/2007 |

* cited by examiner

*Primary Examiner* — Christopher Schwartz
(74) *Attorney, Agent, or Firm* — Morgan, Lewis & Bockius LLP

(57) ABSTRACT

An electromagnetic active engine mount apparatus includes a sub-channel through which working fluid flows is formed in the central portion of an electromagnetic drive so as to be able to cool heat generated from the coil of a solenoid section of the electromagnetic drive by repetitive operation of a vibrating member. Thus, the electromagnetic active engine mount apparatus can inhibit the heat generated from the coil to thus prevent thermal damage to various components formed of rubber, and provide improvement of its durability, reduction of its size, and simplification of its structure.

5 Claims, 2 Drawing Sheets

ELECTROMAGNETIC ACTIVE ENGINE MOUNT APPARATUS

CROSS-REFERENCE TO RELATED APPLICATION

The present application claims priority to Korean Patent Application Number 2008-0050371 filed May 29, 2008, the entire contents of which application is incorporated herein for all purposes by this reference.

BACKGROUND OF THE INVENTION

1. Field of the Invention

The present invention relates to an electromagnetic active engine mount apparatus, and more particularly, to an electromagnetic active engine mount apparatus, in which a sub-channel through which working fluid flows is formed in the central portion of an electromagnetic drive so as to cool heat generated from a coil of a solenoid section of the electromagnetic drive by repetitive operation of a vibrating member, thereby inhibiting the heat generated from the coil to thus protect various components formed of rubber from thermal damage, and providing improvement of its durability, reduction of its size, and simplification of its structure.

2. Description of Related Art

The engine of a vehicle may be regarded as a kind of vibration generating source. Thus, when the engine is mounted on a body of the vehicle, a medium called an engine mount is used, thereby preventing vibration generated from the engine and its resultant noise from being transmitted to the vehicle body.

Generally, in the case of small gasoline engine vehicles, a bush-type mount apparatus formed of rubber has been mainly used. In the case of large gasoline engine vehicles and diesel engine vehicles, a hydraulic type engine mount apparatus in which fluid is encapsulated has been used. However, this passive engine mount apparatus cannot block the vibration and noise within all the ranges including a variable operation region from the viewpoint of its structure.

The vibration generated from the engine is varied in idling, low-speed running, and high-speed running. As such, the engine mount apparatus requires different levels of dynamic stiffness in the idling and low-speed running and the high-speed running. In detail, low dynamic stiffness is required in the idling and low-speed running, whereas high dynamic stiffness is required in the high-speed running. In connection with a frequency of the vibration generated from the engine, the vibration can be divided into three regions: a shaking region where low-frequency and high-amplitude vibration occurs, an idle region where middle-frequency and middle-amplitude vibration occurs, and a booming region where high-frequency and low-amplitude vibration occurs. In order to produce a more excellent vibration damping effect, the engine mount apparatus must have different dynamic stiffness according to each region.

However, the aforementioned bush-type or hydraulic-type engine mount apparatus cannot have a vibration damping function for the viewpoint of its structure in all these variable regions. Thus, a recent tendency shows that an active engine mount apparatus is developed so as to be able to control the vibration of the engine in all the variable regions.

Generally, the active engine mount apparatus is configured to reduce the vibration of the engine by mounting a separate vibrating member on the liquid-filled engine mount apparatus and thus actively controlling the vibrating member so as to be vibrated according to a vibration state of the engine. The active engine mount apparatus can be classified as an electromagnetic type, a pneumatic type, etc. according to a mode of operating the vibrating member.

FIG. 1 is a schematic cross-sectional view illustrating the structure of a conventional electromagnet active engine mount apparatus.

As illustrated in FIG. 1, the electromagnet active engine mount apparatus is configured so that a center bolt 11 for coupling with an engine is inserted and coupled into and to the central portion of a main rubber 10. The main rubber 10 is coupled on an upper side of a hollow main pipe 20 by, for instance, curing bonding, and is adhered with a diaphragm 30 on an upper circumference thereof. At this time, an orifice section 50 and a vibrating member 60 are air-tightly coupled on a lower side of the main pipe 20, thereby defining a damping chamber 40 such that a working fluid is encapsulated in an inner space defined by the main rubber 10, diaphragm 30 and main pipe 20. The damping chamber 40 is partitioned into a main liquid chamber 41 and an auxiliary liquid chamber 42 by the orifice section 50 and the vibrating member 60. The main and auxiliary liquid chambers 41 and 42 communicate with each other through an orifice channel 51 formed in the orifice section 50.

Generally, the vibrating member 60 is composed of a vibrating plate 61 and a vibrating rubber 62. The vibrating plate 61 is coupled to the orifice section 50 through the vibrating rubber 62, and is vibrated by an electromagnetic drive 70 mounted at a lower portion thereof.

The electromagnetic drive 70 is mounted below the vibrating member 60 and the orifice section 50, and includes a ring-shaped solenoid 74 generating an electromagnetic force, an armature 75 connected to the vibrating member 60 and moving up and down by means of the solenoid 74, and a case 76 enclosing the armature 75. Here, the solenoid 74 includes a coil 71 wound in a ring shape, a yoke 72 enclosing the outside of the coil 71, and a core 73 repeatedly attaching and detaching the armature 75 by means of the electromagnetic force.

With this configuration, when electric current flows through the coil 71, the armature 75 is repeatedly attached to and detached from the core 73 while moving up and down. Simultaneously, the vibrating plate 61 coupled to the armature 75 also repeatedly moves up and down to generate vibration. The vibration of the vibrating plate 61 is transmitted to the working fluid in the main liquid chamber 41. Owing to this transmission of the vibration of the vibrating plate 61, the vibration transmitted from the engine is reduced.

More specifically, a separate controller controls the solenoid 74 according to the vibration state of the engine to generate a waveform having the same phase as that of the vibration of the engine so as to offset the vibration of the engine. At this time, a filtering plate 80, which has a through-hole 81 in the central portion thereof above the vibrating plate 61, is mounted on the orifice section 50, so that the vibration created by the vibrating plate 61 is transmitted to the main liquid chamber 41 through the through-hole 81 of the filtering plate 80.

Meanwhile, this vibration damping effect caused by the vibrating plate 61 is mainly used to reduce the high-frequency vibration of the engine. In the case of the low-frequency vibration of the engine, as in the ordinary liquid-filled engine mount apparatus, the vibration is reduced by inertial resistance of the working fluid flowing between the main and auxiliary liquid chambers 41 and 42 through the orifice section 50.

Accordingly, this electromagnetic active engine mount apparatus can reduce the vibration of the engine in both the high and low frequency ranges. However, from the viewpoint of its structure, when the vibrating plate 61 is repeatedly operated, heat is generated from the coil 71 of the solenoid 74. Due to this heat generating phenomenon, various rubber components of the engine mount apparatus may be damaged by the heat. As a result, the engine mount apparatus cannot smoothly perform the function of reducing the vibration of the engine, and thus must be frequently replaced by periods.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an electromagnetic active engine mount apparatus, in which a sub-channel through which working fluid flows is formed in the central portion of an electromagnetic drive so as to be able to cool heat generated from the coil of a solenoid section of the electromagnetic drive by repetitive operation of a vibrating member, thereby inhibiting the heat generated from the coil to thus protect various components formed of rubber from thermal damage, and providing improvement of its durability, reduction of its size, and simplification of its structure.

In an aspect of the present invention, the electromagnetic active engine mount apparatus may include a main rubber, into and to which a center bolt is inserted and coupled, a main pipe, one end of which is coupled to the main rubber, a diaphragm coupled to the other end of the main pipe, a damping chamber defined by coupling of the main rubber, main pipe and diaphragm so as to be air-tightly filled therein with a working fluid, and an orifice section and a vibrating member mounted in the damping chamber, the vibrating member being operated by an electromagnetic drive so as to generate vibration to reduce vibration of an engine, wherein the damping chamber is partitioned into an upper liquid chamber and a lower liquid chamber by the orifice section and vibrating member, wherein the lower liquid chamber is partitioned into first and second auxiliary liquid chambers by the electromagnetic drive, the first auxiliary liquid chamber being formed by the vibrating member and the electromagnetic drive and the second auxiliary liquid chamber being formed by the electromagnetic drive and the diaphragm, and wherein the electromagnetic drive includes a sub-channel passing along a central portion thereof such that the first and second auxiliary chambers communicate with each other.

The electromagnetic drive may include a solenoid section generating an electromagnetic force, and an armature coupled with the vibrating member on one side thereof such that the vibrating member generates vibration, and moving up and down by means of the electromagnetic force of the solenoid section, the sub-channel vertically passes along the central portions of the solenoid section and armature.

The solenoid section may include a coil wound in a ring shape, a yoke enclosing the coil, a core to and from which the armature is repeatedly attached and detached by the electromagnetic force, and a case enclosing the yoke and core, and the sub-channel passes through central portions of the core and case, wherein the yoke, core, and case are integrally formed by injection molding such that the working fluid does not flow into the case, wherein the case includes a sealing member in order to prevent the working fluid from flowing from the sub-channel to the yoke through a gap occurring when the armature is detached from the core, and wherein the sealing member is mounted on the case adjacent to the yoke and configured to and dimensioned to seal the core and the case such that the working fluid is filled in the gap.

In another aspect of the present invention, the orifice section may include an orifice body in which an orifice channel is formed, and a disc-shaped orifice upper plate coupled to an upper surface of the orifice body and having at least one through hole in a central portion thereof, and the vibrating member is elastically coupled to the orifice body so as to be located on a lower side of the through-hole of the orifice upper plate, wherein the orifice body has a U-shaped vertical cross section where one side thereof is open and communicates between the upper damping chamber, the sub channel and the lower damping chamber.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
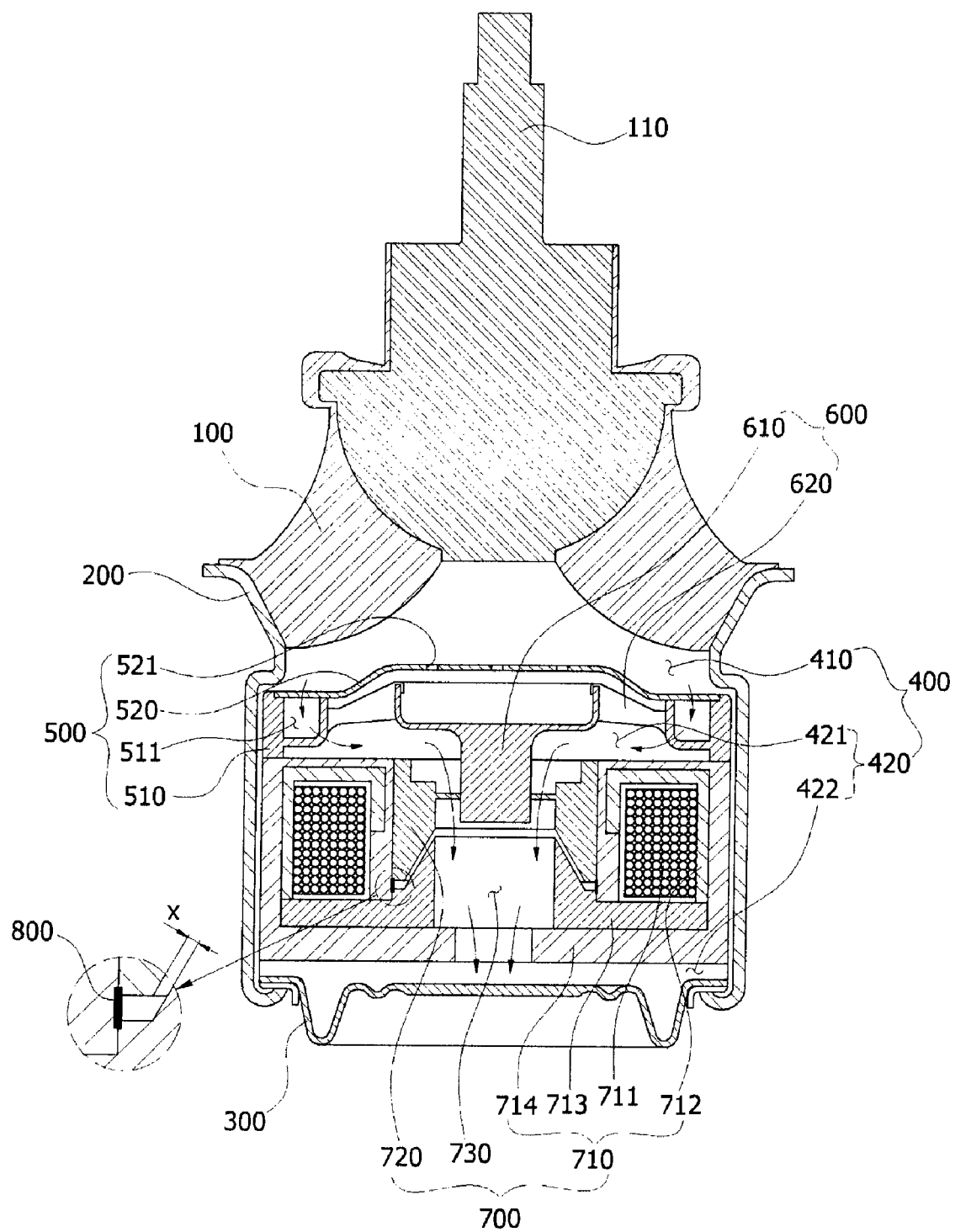
FIG. 2 is a schematic cross-sectional view illustrating the structure of an exemplary electromagnetic active engine mount apparatus according to the present invention.

FIG. 2 is a schematic cross-sectional view illustrating the structure of an electromagnetic active engine mount apparatus according to various embodiments of the present invention.

As illustrated in FIG. 2, the electromagnetic active engine mount apparatus includes a damping chamber 400 defined by coupling of a main rubber 100, into and to which a center bolt 110 for coupling with an engine is inserted and coupled at a central portion thereof, a main pipe 200, and a diaphragm 300, and air-tightly filled therein with a working fluid. Here, the main rubber 100 is coupled to the main pipe 200, particularly on an upper side of the main pipe 200, by bonding such as curing bonding. The diaphragm 300 is coupled to the main pipe 200, particularly on a lower side of the main pipe 200.

The damping chamber 400 is provided therein with an orifice section 500 and a vibrating member 600, which partition the damping chamber 400 into an upper liquid chamber 410 and a lower liquid chamber 420, as illustrated in FIG. 2. Further, an electromagnetic drive 700 is mounted on a lower side of the orifice section 500 in order to operate the vibrating member 600. Here, the lower liquid chamber 420 is partitioned into two auxiliary liquid chambers by the electromagnetic drive 700, i.e. a first auxiliary liquid chamber 421 located above the electromagnetic drive 700, and a second auxiliary liquid chamber 422 located blow the electromagnetic drive 700.

Here, as illustrated in FIG. 2, a sub-channel 730 passing through the electromagnetic drive 700 is formed, as a linear channel, in the central portion of the electromagnetic drive 700.

Further, according to various embodiments of the present invention, the electromagnetic drive 700 includes a ring-shaped solenoid section 710 generating an electromagnetic force, and an armature 720 coupled with the vibrating member 600 on one side thereof such that the vibrating member 600 generates vibration, and moving up and down by means of the electromagnetic force of the solenoid section 710. Here, the solenoid section 710 includes a coil 711 wound in a ring shape, a yoke 712 enclosing the coil 711, a core 713 to and from which the armature 720 is repeatedly attached and detached by the electromagnetic force, and a case 714 enclosing the yoke 712 and core 713.

With this configuration, the sub-channel 730 passes through central portions of the solenoid section 710 and armature 720 in a vertical direction so as to function as a linear channel. At this time, the sub-channel 730 can be formed so as to pass through the core 713 and the case 714 of the solenoid section 710.

Meanwhile, according to various embodiments of the present invention, as illustrated in FIG. 2, the vibrating member 600 includes a vibrating plate 610 coupled with the armature 720, and a vibrating rubber 620 adhered to the vibrating plate 610 at an inner end thereof and an orifice body 510 at an outer end thereof.

With this configuration, the electromagnetic active engine mount apparatus reduces ordinary low-frequency-band vibration of the engine by means of inertial resistance of the working fluid flowing between the upper liquid chamber 410 and the lower liquid chamber 420 through the orifice section 500, and high-frequency-band vibration of an engine by the electromagnetic drive 700 operating the vibrating member 600 so as to generate vibration whose waveform has the same phase as that of the vibration of the engine, thereby offsetting the vibration of the engine. At this time, the electromagnetic drive 700 is preferably configured to be controlled by a separate controller (not shown) such that the vibrating member 600 generates vibration so as to be suitable for a vibration state of the engine. Thus, the electromagnetic drive 700 can be controlled so as to reduce the vibration of the engine having the high frequency band as well as the low frequency band.

Further, unlike a conventional electromagnetic active engine mount apparatus, the electromagnetic active engine mount apparatus according to various embodiments of the present invention is configured so that the coil 711 is cooled through the sub-channel 730 although heat is generated from the coil 711 of the solenoid section 710 of the electromagnetic drive 700 by the electric current supplied to the coil 711. This is because the sub-channel through which the working fluid passes is formed in the central portion of the electromagnetic drive 700. Thus, the sub-channel 730 may be formed around the solenoid section 710 in order to cool the coil 711. However, according to various embodiments of the present invention, it is more excellent in the aspect of cooling efficiency to form the sub-channel 730 in the central portion of the electromagnetic drive 700. In detail, since the heat generated from the coil 711 is partially cooled around the solenoid section 710 by the air, the generation of the heat becomes more serious at the central portion of the solenoid section 710. As such, the sub-channel 730 is preferably formed in the central portion of the solenoid section 710. Further, in the case in which the sub-channel 730 is formed in the central portion of the solenoid section 710, the solenoid section 710 can reduce its size and weight compared to the case in which the sub-channel 730 is formed around the solenoid section 710.

Meanwhile, as illustrated in FIG. 2, the electromagnetic drive 700 is configured so that a gap "X" occurs when the armature 720 is detached from the core 713. In order to prevent the working fluid from flowing from the sub-channel 730 to the yoke 712 through this gap "X," a separate sealing member 800 is preferably mounted on the case 714 at one end of the gap "X." Thereby, the coil 711 can be prevented from causing a short circuit due to inflow of the working fluid. Further, the sealing member 800 is preferably mounted on the case 714 adjacent to the yoke 712 as illustrated in FIG. 2. Thus, the working fluid is filled in the gap "X" through the sub-channel 730. This filling of the working fluid can remarkably reduce noise generated by mutual contact when the armature 720 is repeatedly attached to and detached from the core 713.

Alternatively, the yoke 712, core 713, and case 714 may be integrally formed by injection molding without this separate sealing member 800 such that the working fluid does not flow into the case 714.

Further, according to various embodiments of the present invention, the orifice section 500 includes a ring-shaped orifice body 510 in which an orifice channel 511 is formed, and a disc-shaped orifice upper plate 520 coupled to an upper surface of the orifice body 510 and having at least one through hole 521 in a central portion thereof. Here, the vibrating member 600 is preferably located on a lower side of the through-hole 521 of the orifice upper plate 520. Further, the orifice section 500 is preferably configured so that the orifice body 510 has a U-shaped vertical cross section where one side thereof is open, and that the orifice upper plate 520 is coupled to the open upper surface of the orifice body 510, thereby defining the orifice channel 511 therein.

Figure 1:
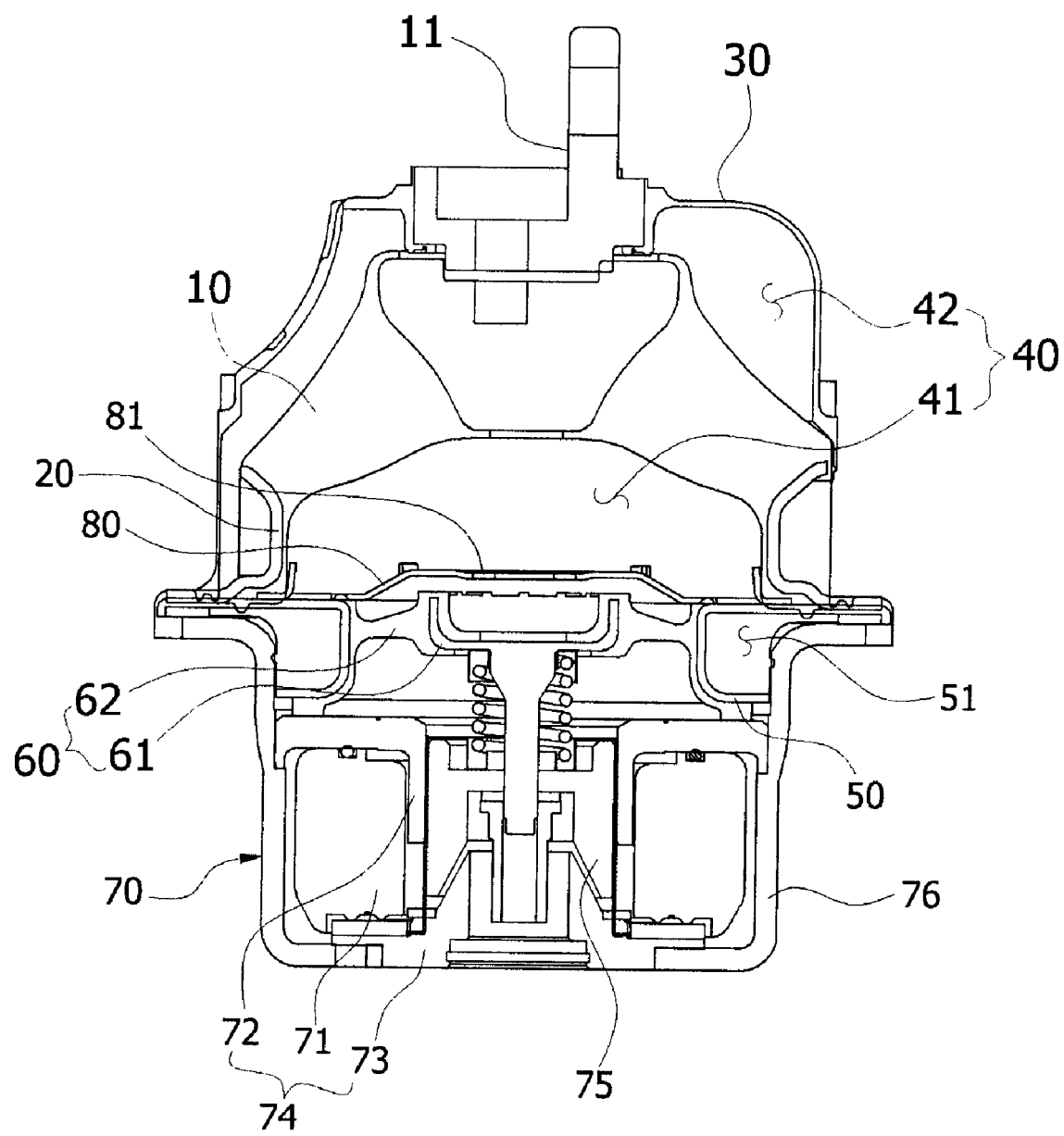
FIG. 1 is a schematic cross-sectional view illustrating a conventional electromagnetic active engine mount apparatus.

In detail, the orifice upper plate 520 is designed to constitute the orifice section 500, and simultaneously function as a filtering plate (see the reference numeral 80 of FIG. 1) filtering the vibration generated by the vibrating member 600 so as to be transmitted to the upper liquid chamber 410 through the through-hole 521, as described above.

Further, the orifice body 510 is formed of aluminum by die casting so as to be easily formed in a simple shape.

For convenience in explanation and accurate definition in the appended claims, the terms "upper" and "lower" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An electromagnetic active engine mount apparatus comprising:

a main rubber, into which a center bolt is inserted and coupled;

a main pipe, one end of which is coupled to the main rubber;

a diaphragm coupled to the other end of the main pipe;

a damping chamber defined by coupling of the main rubber, main pipe and diaphragm so as to be air-tightly filled therein with a working fluid; and an orifice section and a vibrating member mounted in the damping chamber, the vibrating member being operated by an electromagnetic drive so as to generate vibration to reduce vibration of an engine;

wherein the damping chamber is partitioned into an upper liquid chamber and a lower liquid chamber by the orifice section and vibrating member;

wherein the lower liquid chamber is partitioned into first and second auxiliary liquid chambers by the electromagnetic drive, the first auxiliary liquid chamber being formed by the vibrating member and the electromagnetic drive and the second auxiliary liquid chamber being formed by the electromagnetic drive and the diaphragm;

wherein the electromagnetic drive includes a sub-channel passing along a central portion thereof such that the first and second auxiliary chambers communicate with each other;

wherein the electromagnetic drive includes a solenoid section generating an electromagnetic force, and an armature coupled with the vibrating member on one side thereof such that the vibrating member generates the vibration, and moving up and down by means of the electromagnetic force of the solenoid section;

wherein the sub-channel vertically passes along the central portions of the solenoid section and armature;

wherein the solenoid section includes a coil wound in a ring shape, a yoke enclosing the coil, a core to and from which the armature is repeatedly attached and detached by the electromagnetic force, and a case enclosing the yoke and core;

wherein the sub-channel passes through central portions of the core and case; and wherein the case includes a sealing member in order to prevent the working fluid from flowing from the sub-channel to the yoke through a gap occurring when the armature is detached from the core.

2. The electromagnetic active engine mount apparatus according to claim 1, wherein, the orifice section includes an orifice body in which an orifice channel is formed, and a disc-shaped orifice upper plate coupled to an upper surface of the orifice body and having at least one through hole in a central portion thereof, and the vibrating member is elastically coupled to the orifice body so as to be located on a lower side of the through-hole of the orifice upper plate.

3. The electromagnetic active engine mount apparatus according to claim 2, wherein the orifice body has a U-shaped vertical cross section where one side thereof is open and communicates between the upper damping chamber, the sub channel and the lower damping chamber.

4. The electromagnetic active engine mount apparatus according to claim 1, wherein the yoke, core, and case are integrally formed by injection molding such that the working fluid does not flow into the case.

5. The electromagnetic active engine mount apparatus according to claim 1, wherein the sealing member is mounted on the case adjacent to the yoke and configured and dimensioned to seal the core and the case such that the working fluid is filled in the gap.

* * * * *